(12) United States Patent
Williams et al.

(10) Patent No.: US 11,124,319 B2
(45) Date of Patent: Sep. 21, 2021

(54) RE-USEABLE, DEPLOYABLE, SUN-SHADE AND SOLAR SAIL MECHANISM

(71) Applicant: THE BOEING COMPANY, Chicago, IL (US)

(72) Inventors: Timothy L. Williams, Burien, WA (US); Ronald J. Fusetti, Maple Valley, WA (US); Darrell M. Storvick, Tukwila, WA (US); Douglas G. Kon, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 302 days.

(21) Appl. No.: 16/292,658

(22) Filed: Mar. 5, 2019

(65) Prior Publication Data

US 2020/0283172 A1    Sep. 10, 2020

(51) Int. Cl.
*B64G 1/22* (2006.01)
*B64G 1/40* (2006.01)

(52) U.S. Cl.
CPC ............. *B64G 1/222* (2013.01); *B64G 1/407* (2013.01)

(58) Field of Classification Search
CPC .......... B64G 1/222; B64G 1/44; B64G 1/443; B64G 1/446; B64G 1/648; B64G 1/407
See application file for complete search history.

(56) References Cited

U.S. PATENT DOCUMENTS

| | | | | |
|---|---|---|---|---|
| 5,826,832 A | * | 10/1998 | Stich | H02S 30/20 244/172.6 |
| 6,747,541 B1 | * | 6/2004 | Holt | B64G 1/222 337/401 |
| 8,683,755 B1 | * | 4/2014 | Spence | B64G 1/222 52/108 |
| 9,004,410 B1 | * | 4/2015 | Steele | B64G 1/44 244/172.7 |
| 9,611,056 B1 | * | 4/2017 | Spence | B64G 1/443 |
| 10,160,555 B2 | * | 12/2018 | Turse | B64G 1/222 |
| 2011/0030178 A1 | * | 2/2011 | Valembois | B64G 1/222 24/458 |
| 2014/0166815 A1 | * | 6/2014 | Dula | B64G 1/62 244/164 |
| 2016/0311558 A1 | * | 10/2016 | Turse | B64G 1/222 |
| 2019/0092496 A1 | * | 3/2019 | Santos Soto | B64G 1/222 |
| 2021/0028745 A1 | * | 1/2021 | Sekine | H01L 35/30 |

* cited by examiner

*Primary Examiner* — Joshua J Michener
*Assistant Examiner* — Nor Alaa Bashash
(74) *Attorney, Agent, or Firm* — Marshall, Gerstein & Borun LLP

(57) ABSTRACT

An assembly for deployment and retraction of a panel for outer space environment usage, includes a member secured to the panel with the member having an axis of rotation. Mass component connected to the panel, with panel wrapped about member with mass component positioned a first radial distance from the axis of rotation. Mass component has a mass per unit area greater than a mass per unit area of the panel adjacent to the mass component. With a rate of rotation of the mass component and member being same, the mass component rotates about the axis of rotation at a second radial distance from the axis of rotation, wherein the second radial distance is greater in dimension than the first radial distance. With a rate of rotation of the mass component and the member changed to be different, radial distance of the mass component to the axis of rotation decreases.

20 Claims, 11 Drawing Sheets

RE-USEABLE, DEPLOYABLE, SUN-SHADE AND SOLAR SAIL MECHANISM

FIELD

This disclosure relates to panels to be deployed in outer space, and more particularly to panels to be deployed from a spacecraft for use as a sun-shade or a solar sail.

BACKGROUND

Panels are used in outer space for purposes of providing screening from sunlight or as a solar sail for solar power propulsion. When the panel is used as a sun-shade for a spacecraft so as to block sunlight, the blocking of sunlight is beneficial for any one or more of a variety of purposes such as to prevent thermal loading, overexposing of optical sensors, lens flares or extended exposure to a spacecraft window aligned with the sun light. Once the panel is deployed outside of the spacecraft, the panel remains deployed. In other instances, a panel is deployed as a solar sail to provide propulsion for generally smaller mass spacecraft. Solar sails can provide consistent slow propulsion and once the solar sail is deployed, the solar sail also remains deployed. In either application of the panel, the panel is not retractable and re-deployable as needed.

The deployed panels generally have a framework which provides support to the panel. The framework and the panel are positioned outside of a spacecraft and the framework and the panel are then unfolded into working position. The framework can be cumbersome in maneuvering outside of the spacecraft and can present complications in unfolding process of the framework and panel to an opened deployed position. Moreover, the framework adds to the spacecraft payload and occupies limited available space within the spacecraft until the panel is deployed. There is a need to develop an assembly for deploying panels in outer space which do not require framework and which can be retracted for stowing of the panels for redeployment and reuse as needed.

SUMMARY

An example includes an assembly for deployment and retraction of a panel for use in an outer space environment which includes a member secured to the panel with the member having an axis of rotation. A mass component is connected to the panel, with the panel wrapped about the member with the mass component positioned a first radial distance from the axis of rotation, wherein the mass component has a mass per unit area greater than a mass per unit area of the panel adjacent to the mass component. With a rate of rotation of the mass component and a rate of rotation of the member having a same rate of rotation, the mass component rotates about the axis of rotation at a second radial distance from the axis of rotation, wherein the second radial distance is greater in dimension than the first radial distance. With a rate of rotation of the mass component and the rate of rotation of the member being changed from having the same rate of rotation to having different rates of rotation, a radial distance of the mass component to the axis of rotation decreases from the second radial distance.

An example includes a method for deploying and retracting a panel for use in an outer space environment which includes rotating a member to have a rate of rotation, wherein the member has an axis of rotation and the rate of rotation of the member is in a first rotational direction about the axis of rotation. In addition, the member includes a panel secured to the member, with the panel wrapped extending about the member in a second rotational direction, which opposes the first rotational direction. In addition, is a mass component connected to the panel having a mass per unit area greater than a mass per unit area of the panel adjacent to the mass component and positioned a first radial distance from the axis of rotation. Changing the rate of rotation of the member to one of a reduced rate of rotation or the member is stopped from rotating, the mass component moves about the axis of rotation in the first rotational direction and increases distance from the axis of rotation of the member beyond the first radial distance and moves to a second radial distance from the axis of rotation. Changing the rate of rotation of the member to have a same rate of rotation as the rate of rotation of the mass component with the mass component attaining the second radial distance from the axis of rotation greater than the first radial distance from the axis of rotation. The method further includes changing the rate of rotation of the member from the same rate of rotation of the mass component, a radial distance of the mass component to the axis of rotation decreases from the second radial distance.

The features, functions, and advantages that have been discussed can be achieved independently in various embodiments or may be combined in yet other embodiments further details of which can be seen with reference to the following description and drawings.

DESCRIPTION

In referring to FIGS. 1-5, assembly 10 is shown for deployment and retraction of panel 12 for use in an outer space environment. Depending on the use intended for panel 12, whether panel 12 is for use as a sun-shade or as a solar sail for a spacecraft, panel 12 is constructed from a select material which would be suitable for the particular intended use of panel 12. The material selected would have characteristics of being relatively thin, lightweight, flexible, strong and durable so as to resist the harsh conditions of outer space. Assembly 10, as will be described herein, will deploy panel 12, retract panel 12 and stow panel 12 until a need arises to re-deploy and re-use panel 12.

Figure 1:
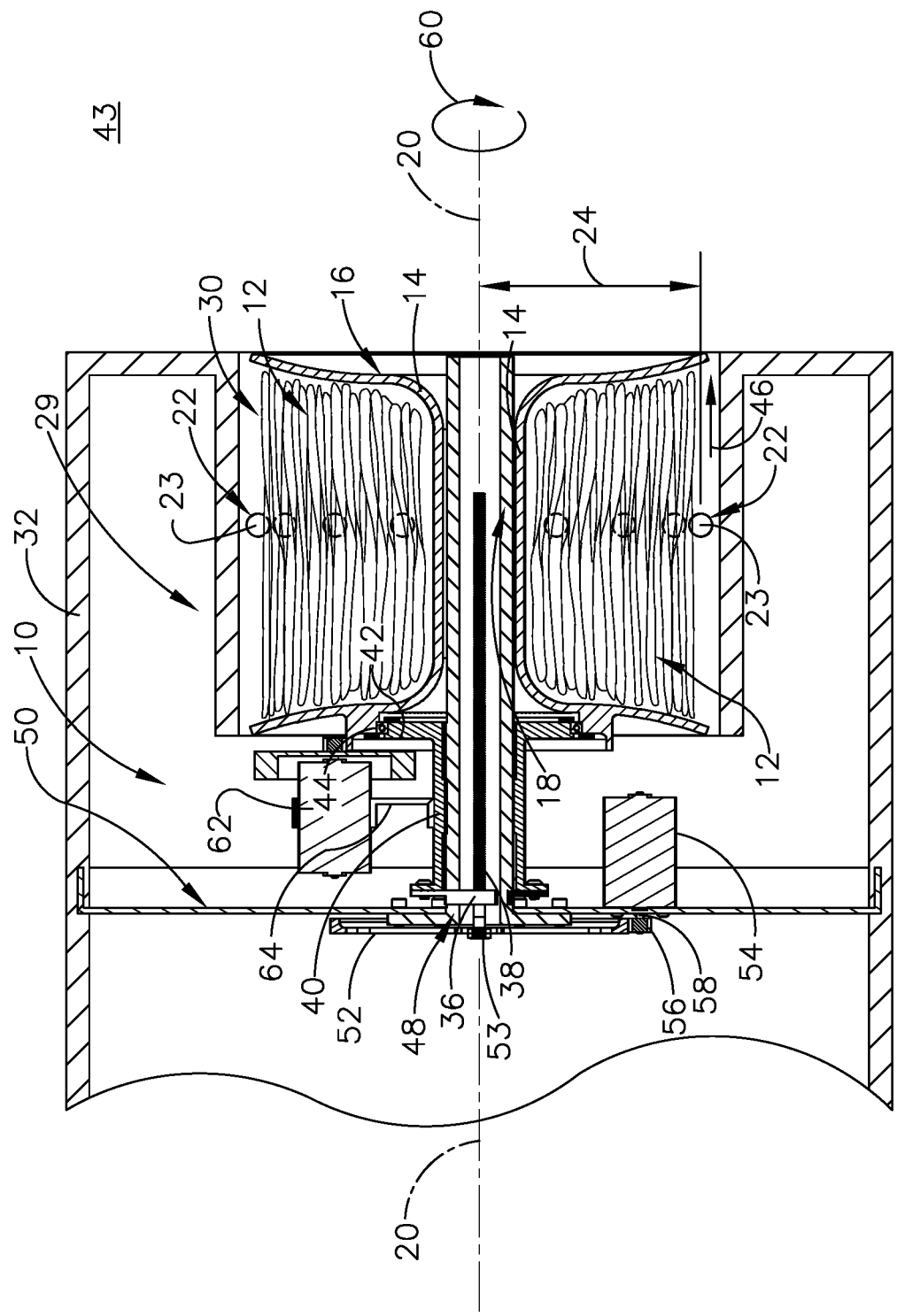
FIG. 1 is a cross section view of an assembly for deployment and retraction of a panel with the assembly carrying the panel in a stowed position on a spacecraft.
Figure 2:
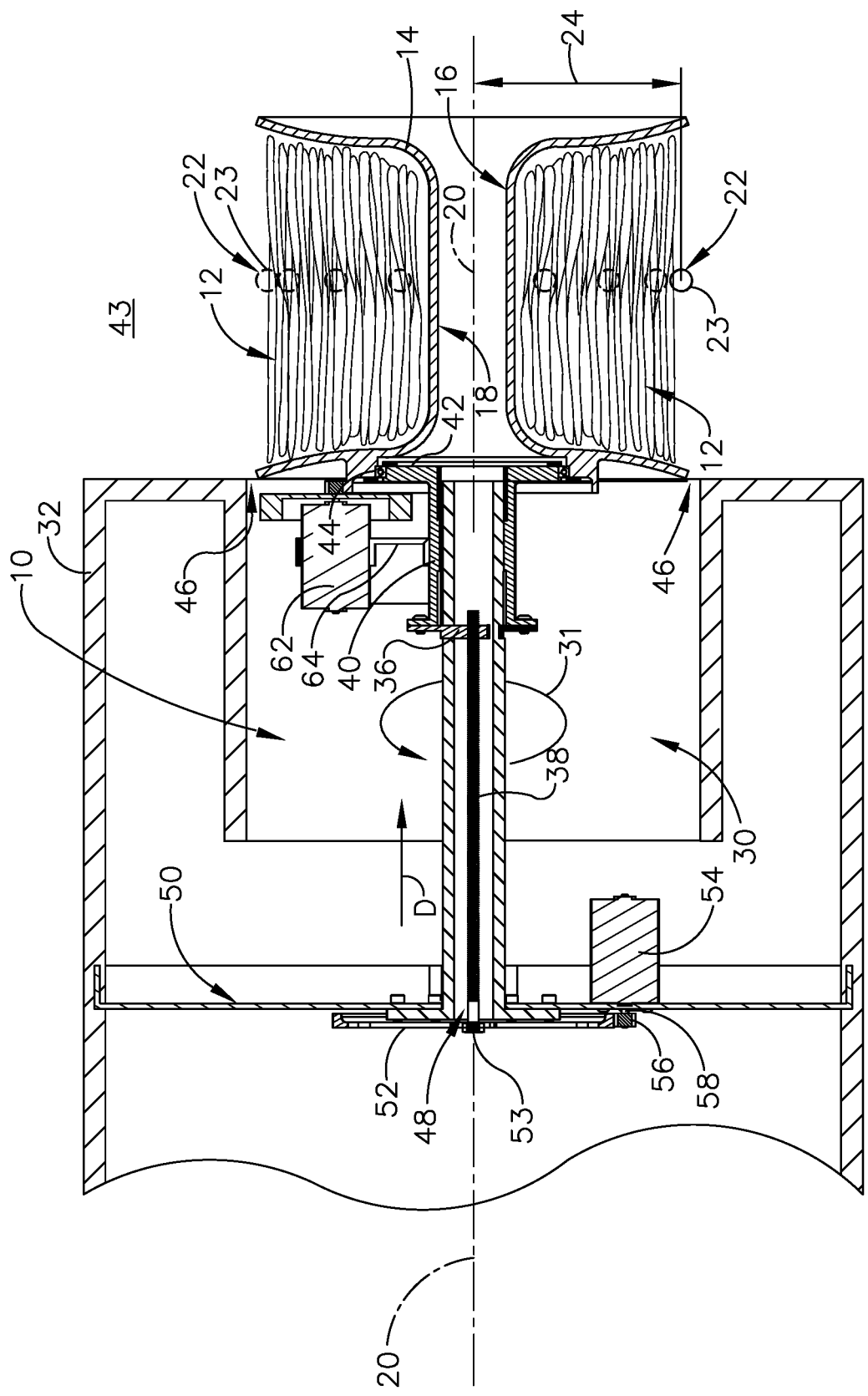
FIG. 2 is the view of the assembly of FIG. 1, with the assembly moved to a position outside of the spacecraft.
Figure 4:
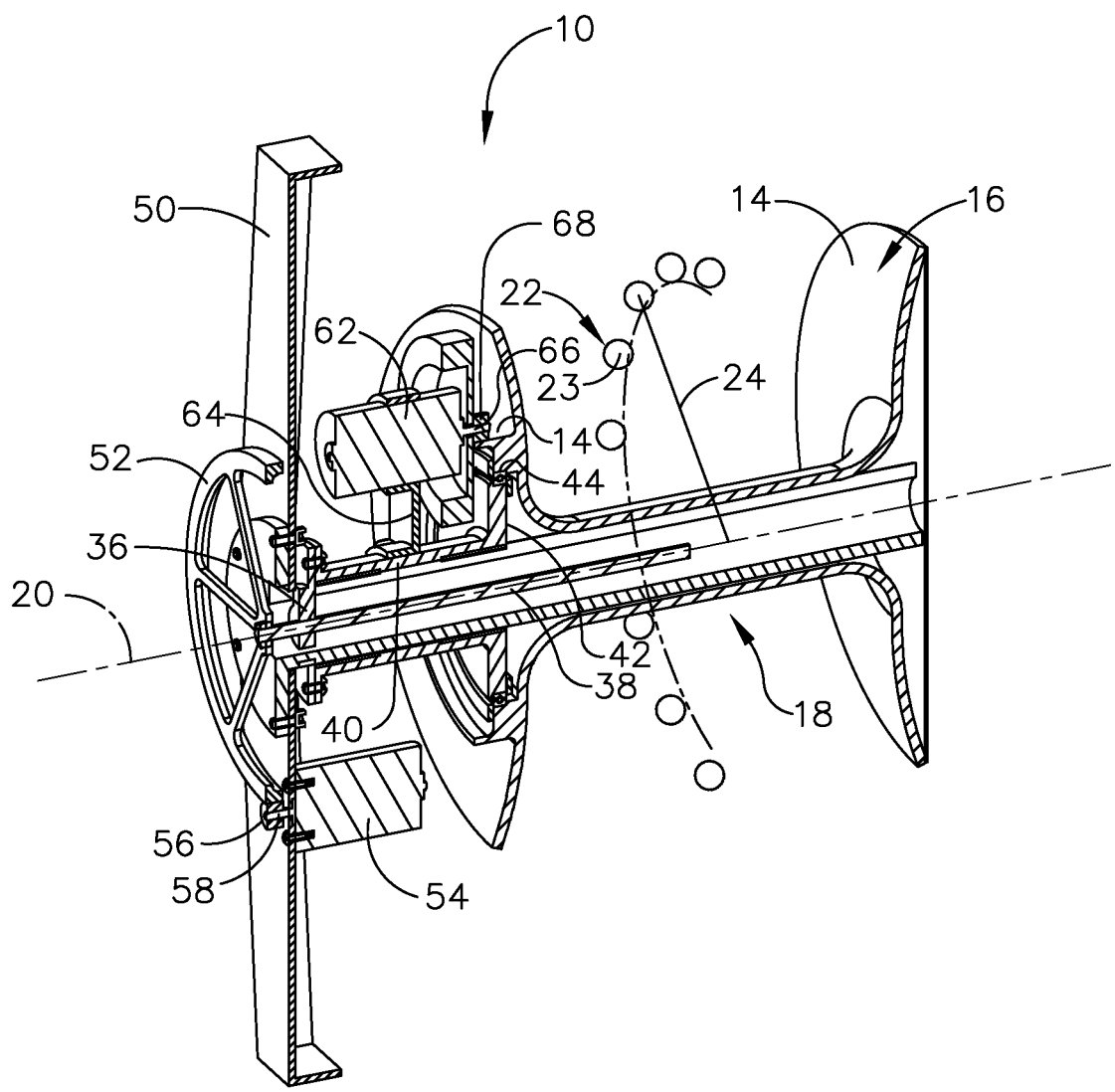
FIG. 4 is a cross section view of the assembly of FIG. 3.
Figure 5:
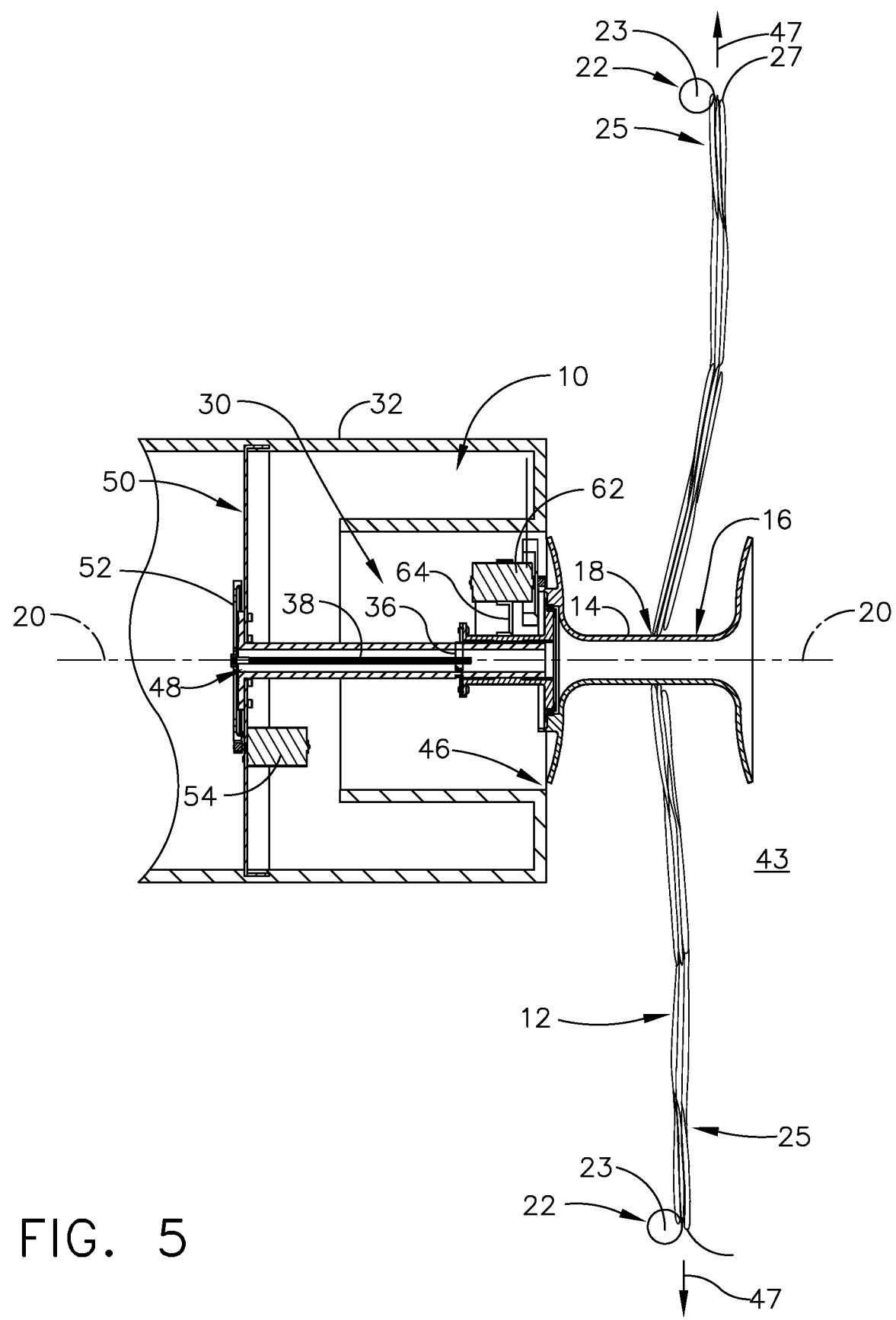
FIG. 5 is a cross section view of the assembly of FIG. 2 with the panel being deployed.

Assembly 10 includes member 14, which can have one of a variety of configurations and in this example includes reel 16. Member 14 or reel 16 is secured to panel 12 and, in this example, is secured about central portion 18, as seen in FIG. 5. Panel 12, in this example, is in a stowed position 29, as seen in FIGS. 1 and 2, wrapped or wound about member 14 or reel 16. Member 14 has an axis of rotation 20 about which member 14 or reel 16 can rotate. In addition, assembly 10 includes mass component 22 connected to panel 12, such that with panel 12 wrapped about member 14, mass component 22 is, in this example, at a first radial distance 24 from axis of rotation 20, as seen in FIG. 1, positioned at an outer perimeter position with respect to wrapped panel 12, as schematically shown in FIG. 4.

Mass component 22 can take on one of a wide variety of configurations, and in this example, mass component 22 includes a number of spherical masses 23 connected to panel 12. Each of these spherical masses 23 can be constructed of one or more of a numerous variety of materials which provide mass component 22 with a mass per unit area greater than a mass per unit area of panel 12 adjacent to mass component 22.

Mass component 22 can have one of a wide variety of constructions which will provide a concentration of mass greater than adjacent surrounding material of panel 12. In this example, spherical masses 23 provide discrete objects constructed of, in this example, metallic material which has an increased mass density concentration than surrounding material of panel 12. Other examples of constructions of mass component 22 can, for example, include multiple layers of material, such as the material used to construct panel 12, positioned (not shown) about outer portion 25 of panel 12, such as shown in FIG. 5, wherein panel 12 is in the process of being deployed in direction 47 away from axis of rotation 20 of member 14 or reel 16. With panel 12 extending away from axis of rotation 20, mass component 22 is spaced apart from axis of rotation 20.

If optimal amount of panel 12 is in need of being deployed, mass component 22, as in the present example, is positioned at or near perimeter 27 of panel 12 so as to accomplish full extension of panel 12 away from axis of rotation 20. Additional examples of construction of mass component 22 can include securing an increased mass concentration positioned extending about outer portion 25 or at or near perimeter 27. This increased mass concentration can include a configuration of a ring or a linked-chain secured to panel 12 extending about outer portion 25, at or near perimeter 27 of panel 12, or at any location on panel 12 as needed. A ring or chain-like configuration can be constructed of a higher density material than the material of which panel 12 is constructed. With mass component 22 having a mass per unit area greater than a mass per unit area of the panel 12 adjacent to the mass component 22 and with mass component 22 positioned at outer portion 25 or at or near perimeter 27 of panel 12, mass component 22, as will be discussed, will provide angular momentum to facilitate full deployment of panel 12 from a wrapped position about member 14 and to facilitate subsequent full retraction of panel 12 into a wrapped position about member 14 or reel 16.

With panel 12 wrapped in an initial rotational direction about member 14 along with mass component 22 and with mass component 22 is positioned, in this example, at or near perimeter 27 of panel 12, mass component 22 is positioned at first radial distance 24 from axis of rotation 20 with panel 12 wrapped about member 14. Mass component 22 is positioned about a perimeter of wrapped panel 12 as seen schematically as in FIG. 3 and as seen in FIG. 1 with panel 12 in stowed position 29 about member 14.

Figure 6:
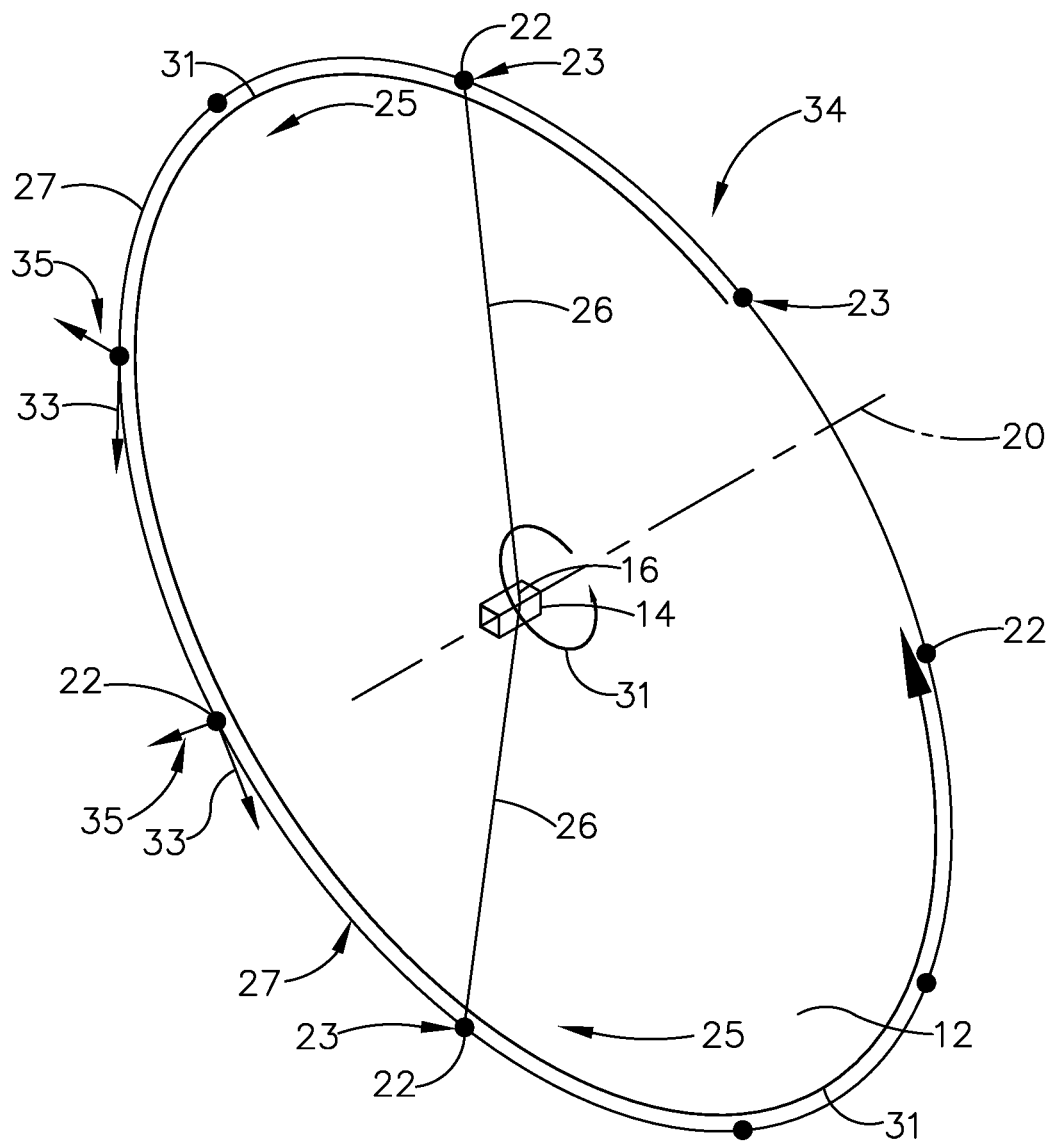
FIG. 6 is a schematic perspective view of the panel in a deployed position.

With reel 16 moved outside of compartment 30, defined by spacecraft 32, and moved outside of spacecraft 32, as seen in FIG. 2, panel 12 is in position to be deployed from member 14. Deployment of panel 12 from an initial wrapped condition about member 14 and retraction of panel 12 from a deployed position will be discussed in further detail herein. With panel 12 deployed from member 14, as seen in FIG. 6, member 14 or reel 16 is rotated with a rate of rotation of the mass component 22 being the same and in a same rotational direction as first rotational direction 31. In this example, with a rate of rotation of mass component 22 and a rate of rotation of member 14 having a same rate of rotation, mass component 22 rotates about axis of rotation 20 at second radial distance 26 from axis of rotation 20. Second radial distance 26, as seen in FIG. 6, is greater in dimension than first radial distance 24, as seen in FIGS. 1 and 2. With mass component 22 at second radial distance 26, in this example, panel 12 is in fully deployed position 34.

With panel 12 in fully deployed position 34, as seen in FIG. 6, mass component 22 has angular momentum as represented by tangential momentum component designated by arrow 33 and represented by radial momentum component designated by arrow 35. Panel 12 retains mass component 22, as in this example, traveling about axis of rotation 20 of member 14 in a circular orbit and with member 14 and mass component 22 maintaining the same rate of rotation, in this example, panel 12 maintains a flat and unwrinkled configuration orbiting about axis of rotation 20.

Figure 7:
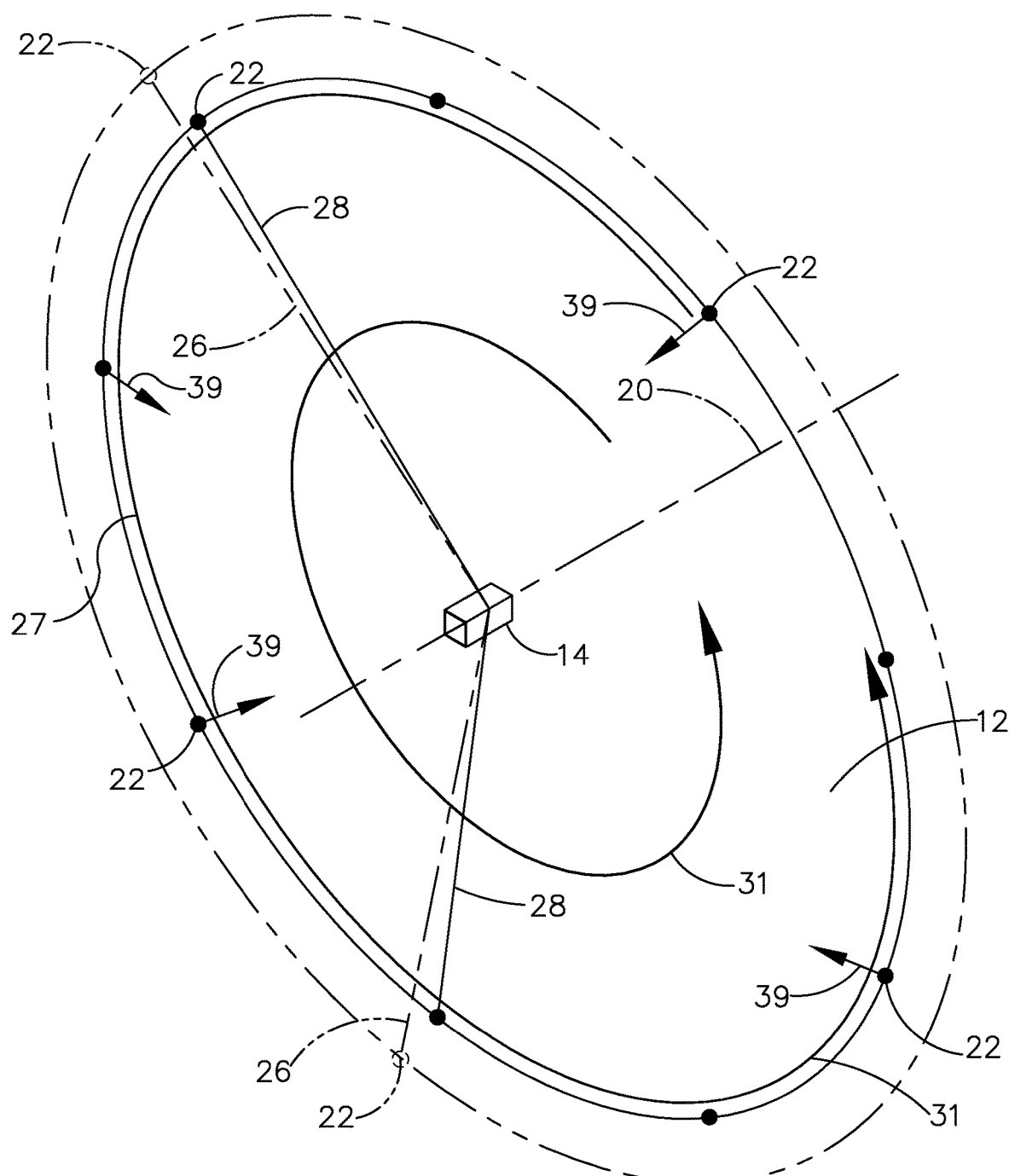
FIG. 7 is a schematic view of the panel retracting from the deployed position of FIG. 6.

With the rate of rotation of mass component 22 and the rate of rotation of member 14 being changed from the same rate of rotation, as seen in FIG. 6, to having different rates of rotation, as seen in FIG. 7, radial distance 28 of mass component 22 to axis of rotation 20 decreases, in radial direction 39, from second radial distance 26, as seen in FIG. 7. Reduction of radial distance from second radial distance 26 to radial distance 28 occurs with panel 12 and mass component 22 being wrapped about member 14 in an opposing rotational direction from the initially wrapped position of panel 12 and mass component 22 about member 14. Retraction of mass component 22 and panel 12 from the fully deployed position 34 will also be discussed in further detail herein.

In referring to FIGS. 1-5, member 14 or reel 16 is connected to spacecraft 32, which will be discussed herein, such that member 14 or reel 16 can be extended from and retracted back into compartment 30 of spacecraft 32 and member 14 or reel 16 is also rotatable relative to spacecraft 32 with member 14 or reel 16 positioned outside of spacecraft 32. In stowed position 29, as seen in FIG. 1, member 14 or reel 16 is connected to and carrying panel 12 and mass component 22 is connected to panel 12 such that panel 12, with mass component 22 connected to panel 12, is wrapped about member 14 or reel 16 and member 14 or reel 16, panel 12 and mass component 22 are positioned within compartment 30 defined by spacecraft 32.

For deployment of panel 12, member 14 or reel 16 is first moved out of compartment 30 from stowed position 29, as seen in FIG. 1, to a position outside of spacecraft 32, as seen in FIG. 2. In this example, a ball screw arrangement is used for providing translational movement of member 14 or reel 16 in direction D, as seen in FIG. 2, out of opening 46, defined by compartment 30 of spacecraft 32, to a position 43 outside of spacecraft 32. Similarly, the ball screw arrangement is also used as needed to provide translational movement of reel 16 in a direction opposing direction D for retracting member 14 or reel 16 along with panel 12 and mass component 22 back into compartment 30 into stowed position 29 from position 43 outside of spacecraft 32.

Ball screw arrangement includes drive nut 36 having threads (not shown) and deployment screw 38 having threads (not shown), wherein the threads of drive nut 36 and deployment screw 38 are compatible and engage with one another. Deployment screw 38 is positioned within compartment 30 and extends in direction D toward opening 46 defined by compartment 30, as seen in FIG. 2. In this example, as seen in FIGS. 1 and 2, member 14 or reel 16 is connected to drive nut 36 with drive nut 36 secured to bracket 40 and flange 42 of bracket 40 having ball bearing connection 44 with member 14 or reel 16. As a result, drive nut 36 can impart translational motion to member 14 or reel 16 in direction D or opposing direction D as desired.

Deployment screw 38 is associated with first drive motor 54, which is secured to spacecraft 32 with first drive motor 54 being secured to wall member 50 of spacecraft 32, such that first drive motor 54 rotates deployment screw 38 and in turn provides translational movement of drive nut 36 along deployment screw 38. Translational movement of drive nut 36 correspondingly provides translational movement of member 14 or reel 16 in direction D for movement of reel 16 carrying panel 12 and mass component 22 outside of compartment 30 through opening 46 to position 43 outside of spacecraft 32 and translational movement of member 14 or reel 16 carrying panel 12 and mass component 22 in a direction opposing direction D to stowed position 29 within compartment 30.

In this example, deployment screw 38 extends through opening 48 defined in wall member 50 of spacecraft 32 with threads (not shown) of deployment screw 38 engaging threads (not shown) of drive wheel 52 and nut 53 securing drive wheel 52 to deployment screw 38, as seen in FIGS. 1 and 2. Drive wheel 52 is in turn frictionally engaged to first drive motor 54, which is mounted to wall member 50 of spacecraft 32. Wheel 56 of drive shaft 58 of first drive motor 54 imparts rotation to drive wheel 52 with the frictional engagement in this example and in turn rotates deployment screw 38. In this example, first drive motor 54 is configured to rotate drive wheel 52 in opposing directions so as to translate drive nut 36 in corresponding opposing directions, as needed.

With first drive motor 54 rotating the deployment screw 38 in first rotational direction 31, as indicated in FIG. 2, drive nut 36 moves member 14 or reel 16, the panel 12 and mass component 22 through opening 46 defined by compartment 30 in direction D to position 43 outside of compartment 30 and outside of spacecraft 32. With first drive motor 54 rotating deployment screw 38 in second rotational direction 60, as indicated in FIG. 1, drive nut 36 moves member 14 or reel 16, panel 12 and mass component 22 from position 43 outside of compartment 30 and outside of spacecraft 32 back into compartment 30 in a direction opposing direction D to stowed position 29, as seen in FIG. 1.

Second drive motor 62 is connected to drive nut 36, such that second drive motor 62 rotates member 14 or reel 16 with member 14 or reel 16 at position 43 outside of compartment 30 and spacecraft 32, as seen in FIG. 2, in this example and as will be discussed herein. In this example, bracket 64 is secured to second drive motor 62, as seen in FIG. 4, and bracket 64 in turn is secured to bracket 40. As mentioned earlier, bracket 40 is secured to drive nut 36. Thus, as drive nut 36 travels along deployment screw 38, second drive motor 62 similarly travels along with drive nut 36 and member 14. In this example, with member 14 at position 43 outside of compartment 30 and spacecraft 32, second drive motor 62, as seen in FIG. 4, rotates member 14 or reel 16 with drive shaft 66 of second drive motor 62 rotating second drive wheel 68. In this example, second drive wheel 68 frictionally engages member 14 imparting rotation to member 14 about flange 42 of bracket 40 with ball bearing connection 44 positioned between flange 42 and member 14, as seen in FIG. 4. Second drive motor 62 is associated with member 14 with second drive wheel 68 frictionally engaging member 14, such that second drive motor 62 is configured to rotate member 14 in first rotational direction 31 or in second rotational direction 60 about axis of rotation 20 as needed, which will be discussed in more detail herein.

Figure 8:
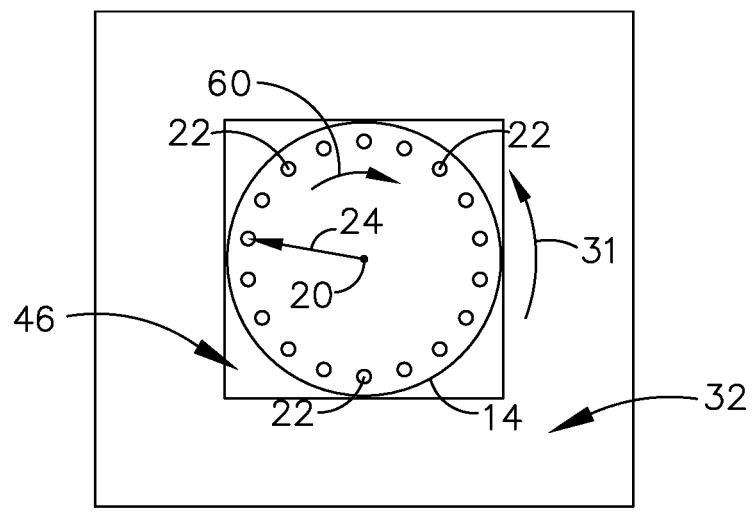
FIG. 8 is a schematic end view of the assembly of FIG. 2, with the mass component and the member rotating in a first rotational direction, with the panel wrapped onto and about the member extending in a second rotational direction, and the rate of rotation of the mass component and the member being the same.

In referring to FIGS. 8-12, member 14, panel 12 secured to member 14 and mass components 22 connected to panel 12 are at position 43 outside of compartment 30 and outside of spacecraft 32 as seen in FIG. 2. Second drive motor 62 is capable of rotating member 14 in one of first rotational direction 31, which for this example is in a counterclockwise direction about axis of rotation 20 of member 14 as seen in FIG. 8, or second rotational direction 60, which for this example is in a clockwise direction about axis of rotation 20 of member 14. As will be discussed, rotation of member 14 in one rotational direction can initiate and attain deployment of panel 12 and rotation of member 14 or reel 16 in an opposing rotational direction can initiate and complete retraction of panel 12, as will be discussed.

In referring to FIG. 8, second drive motor 62, in this example, rotates member 14 in first rotational direction 31 at a first rate of rotation. Panel 12 is positioned wrapped about member 14 extending in second rotational direction 60 about member 14, which is in an opposing direction of first rotational direction 31 of rotation of member 14 and mass component 22. With member 14 rotating at the first rate of rotation in first rotational direction 31, panel 12 remains wrapped about member 14 extending in second rotational direction 60, which results in panel 12 remaining in a compact wrapped position about member 14. Mass component 22 remains at first radial distance 24 from axis of rotation 20 positioned, in this example, about perimeter of panel 12 wrapped about member 14, as seen schematically in FIG. 3. With mass component 22 rotating at the first rate of rotation in first rotational direction 31, mass component 22 acquires an angular momentum in traveling in the first rotational direction 31.

Figure 9:
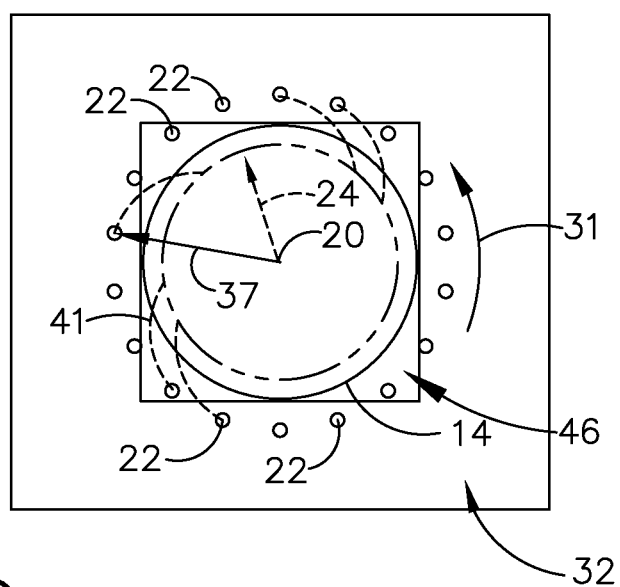
FIG. 9 is a schematic end view the assembly of FIG. 8, with the rate of rotation of the member being reduced relative to the rate of rotation of the mass component, the mass component travels in the first rotational direction relative to the member and travels radially away from the axis of rotation of the member.

In referring to FIG. 9, with one of a reduction of the first rate of rotation of member 14 in first rotational direction 31 about axis of rotation 20 or a stop of rotation of member 14 about axis of rotation 20, the reduction of the first rate of rotation or stopping of member 14 is imparted to member 14 by operation of second drive motor 62. In this example, first rate of rotation of member 14 in first rotational direction 31 has been reduced. As a result of the angular momentum of mass component 22 acquired by the first rate of rotation in the first rotational direction 31, mass component 22 has a tangential momentum component as designated by arrow 33, as seen in FIG. 6 and a radial momentum component as designated by arrow 35 in FIG. 6. With the reduction of the rate of rotation of member 14 from the first rate of rotation, mass component 22 moves, relative to member 14, about axis of rotation 20 of member 14 in first rotational direction 31 and in addition, mass component 22 moves increasing in distance away from axis of rotation 20 beyond first radial distance 24 to an intermediate radial distance 37, as seen in FIG. 9. Mass component 22, in this example, travels in a curvilinear trajectory 41 from mass component 22 positioned at first radial distance 24, as seen in FIG. 8, to intermediate radial distance 37, as seen in FIG. 9.

Figure 10:
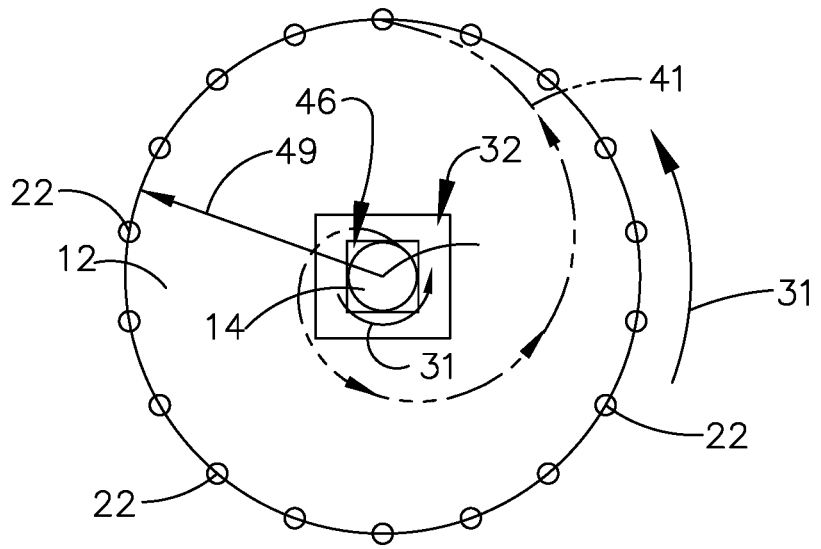
FIG. 10 is a schematic end view of the assembly, from a distance further away from assembly than as seen in FIG. 9, wherein the mass component has continued to travel in the first rotational direction and has continued to travel radially away from the axis of rotation of the member.

In referring to FIG. 10, mass component 22, with acquired angular momentum and with member 14 rotating at a reduced rate of rotation from the first rate of rotation in first rotational direction 31 relative to mass component 22, in this example, mass component 22 continues to travel in curvilinear trajectory 41 in first rotational direction 31 relative to and about member 14 and about axis of rotation 20. As mass component 22 moves relative to and about member 14 and about axis of rotation 20, mass component 22 also increases in distance from axis of rotation 20 to second intermediate radius of rotation 49, as seen in FIG. 10, greater than intermediate radial distance 37, as seen in FIG. 9.

Figure 11:
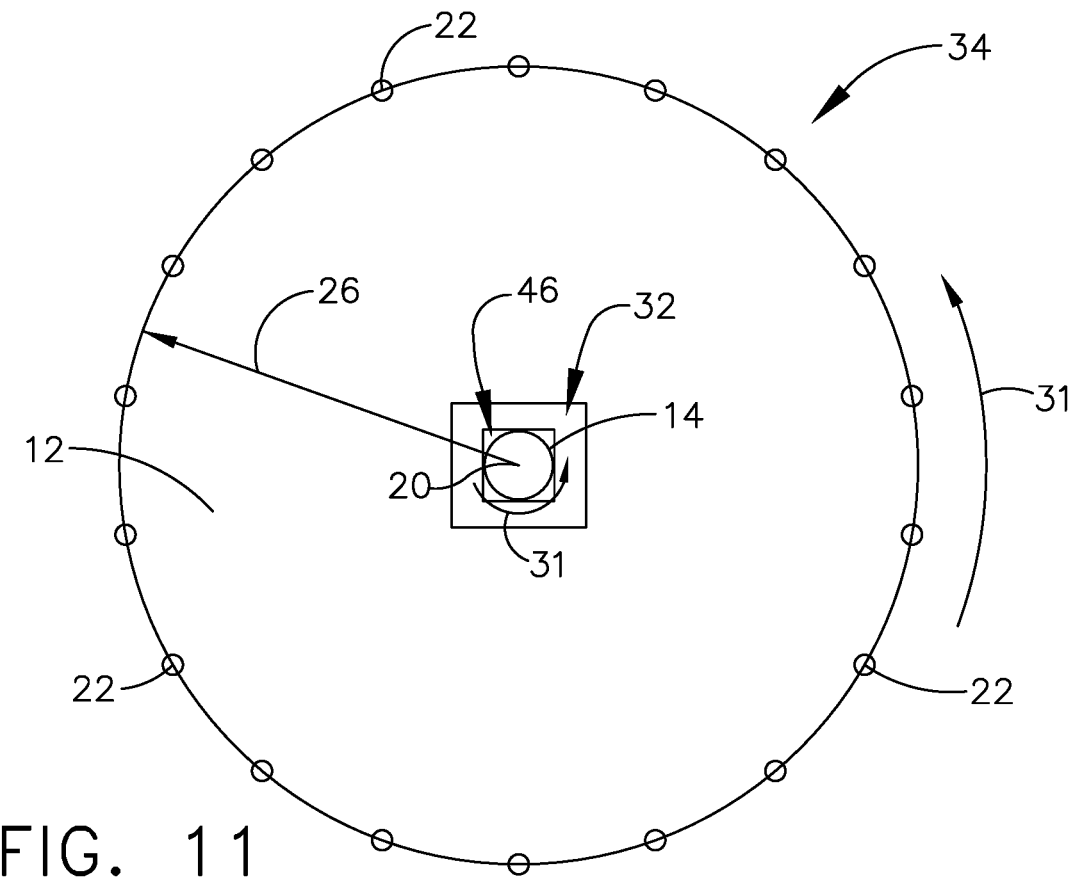
FIG. 11 is a schematic end view of the assembly of FIG. 10, wherein the panel and the mass component have fully deployed and the rate of rotation of the member has been increased in the first rotational direction so as to be the same as the rate of rotation of the mass component.

In referring to FIG. 11, mass component 22 has traveled to fully deployed position 34 of panel 12 to second radial distance 26, as also seen in FIG. 6. Panel 12 connected to mass component 22 restricts mass component 22 from further radial travel away from axis of rotation 20. With mass component 22 attaining second radial distance 26 from axis of rotation 20 of member 14, second drive motor 62 rotates member 14 in first rotational direction 31 such that, in this example wherein the rate of rotation of member 14 had been previously reduced, the rate of rotation of member 14 is now made the same as the rate of rotation of mass component 22 positioned at second radial distance 26 moving in first rotational direction 31. In FIG. 11, mass component 22 and member 14 are rotating at the same rate of rotation in first rotational direction 31 maintaining panel 12 in a fully deployed position 34.

As previously mentioned, mass component 22 acquired an angular momentum imparted to mass component 22 with the first rate of rotation applied to member 14 with second drive motor 62, as seen in FIG. 8. With a reduction of the first rate of rotation to member 14 as applied by second drive motor 62 in this example, as seen in FIG. 9, tangential momentum as designated as arrow 33 in FIG. 6 of mass component 22 moves mass component 22 in first rotational direction 31 relative to member 14 and radial momentum as designated as arrow 35 in FIG. 6 increases radial distance of mass component 22 relative to axis of rotation 20.

As a result, mass component 22 experiences a curvilinear travel path 41 as seen in this example in FIGS. 9 and 10. With mass component 22 attaining second radial distance 26 from the axis of rotation 20 of the member 14, which in this example is fully deployed position 34, second drive motor 62 rotates member 14 in first rotational direction 31 such that a rate of rotation of member 14 is the same as the rate of rotation of mass component 22 in first rotational direction 31 at second radial distance 26. With mass component 22 at second radial distance 26 from axis of rotation 20, panel 12 extends between mass component 22 connected to panel 12 and member 14 secured to panel 12. In this example, with the matching of the rate of rotation of member 14 and mass component 22, and panel 12 restrains mass component 22 from further radial travel from axis of rotation 20, panel 12 rotates in a stable extended planar configuration.

Figure 12:
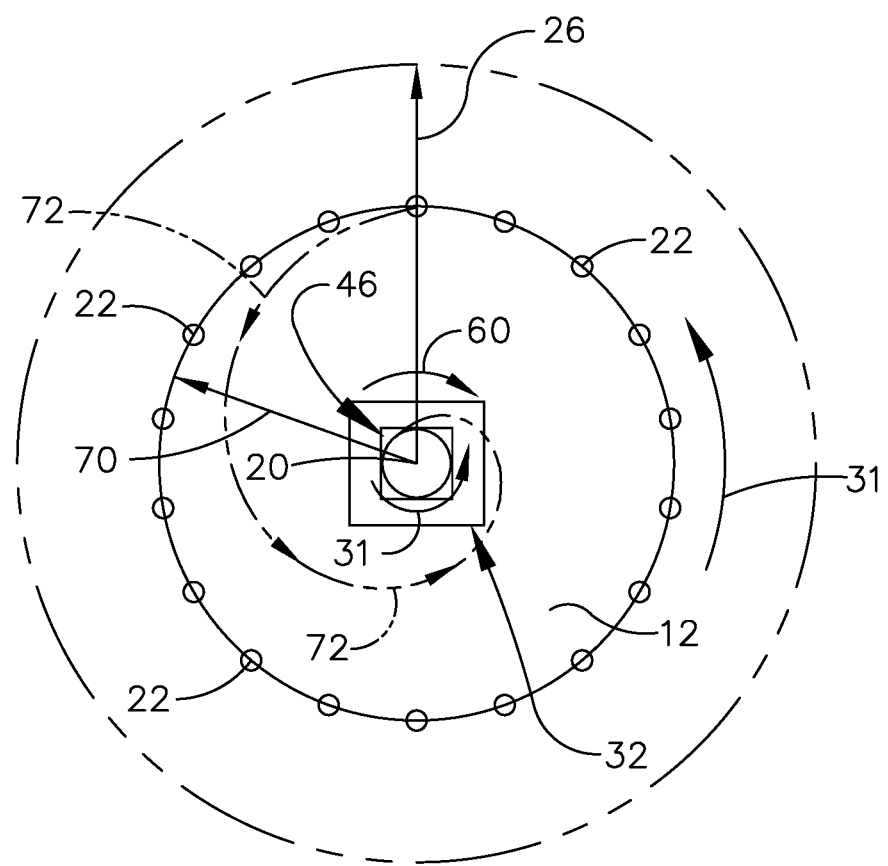
FIG. 12 is a schematic end view of the assembly of FIG. 11, wherein the rate of rotation of the member has been decreased in the first rotational direction relative to the rate of rotation of the mass component such that the panel wraps onto and about the member extending in the first rotational direction.

In referring to FIG. 12, second drive motor 62 changes rotation of member 14 to one of stopping member 14, decreasing the rate of rotation of member 14 in first rotational direction 31 or rotating the member in second rotational direction 60 about axis of rotation 20, which results in panel 12 being wrapped about member 14 extending panel 12 in first rotational direction 31 about member 14. In this example, second drive motor 62 decreases rate of rotation in the first rotational direction 31, resulting in member 14 rotating at a lesser or reduced rate of rotation in the first rotational direction 31 than the rate of rotation of mass component 22. The decreased rate of rotation of member 14 results in mass component 22 rotating about member 14 and axis of rotation 20 at a relatively higher rate of rotation than the rate of rotation of member 14 in first rotational direction 31 resulting in wrapping panel 12 about member 14 as mass component 22 travels about member 14 in the first rotational direction 31. Panel 12 wraps about member 14 extending in first rotational direction 31, which is the opposite direction of wrapping of panel 12 from which panel 12 was originally positioned extending about member 14 in second rotational direction 60 with initiating rotation of member 14 in FIG. 8.

With wrapping of panel 12 about member 14, radial distance of mass component 22 is reduced relative to axis of rotation 20 from second radial distance 26 to radial distance 70, as seen in FIG. 12. Mass component 22, in this example, is traveling at a relatively higher rate of rotation about axis of rotation 20 than member 14 and reducing in radial distance from axis of rotation 20 resulting in traveling in curvilinear path 72, such as shown in FIG. 12. With rate of rotation of member 14 continued at a reduced rate of rotation to that of mass component 22, mass component 22 continues to travel in first rotational direction 31 with panel 12 wrapping about member 14 and mass component 22 continuing to reduce in radial distance from axis of rotation 20. With panel 12 having completed in wrapping about member 14, mass component 22 in this example is positioned about a perimeter of panel 12 as seen schematically in FIG. 3. Panel 12 results in being wrapped about member 14 extending in a direction of first rotational direction 31 at which point rotation imparted to member 14 by second drive motor 62 can be stopped maintaining panel 12 in a compact position on member 14.

With panel 12 wrapped about member 14 now extending in a direction of first rotational direction 31, the user can elect to reposition member 14, panel 12 and mass component 22 back into compartment 30 with activating first drive motor 54 to rotate deployment screw 38, as described earlier, so as to move drive nut 36 in a direction opposing direction D and move member 14, panel 12 and mass component 22 through opening 46 and position member 14, panel 12 and mass component 22 within compartment 30 in stowed position 29 for use at a later time.

With member 14, panel 12 and mass component 22 now stowed within compartment 30 within spacecraft 32, member 14 panel 12 is now wrapped about member 14 extending in first rotational direction 31. Redeployment of panel 12 will be described herein below utilizing the apparatus previously described with the exception of now deploying panel 12 from an initial position of extending about member 14 in a direction of first rotational direction 31 in contrast to deployment of panel 12 described above from panel 12 in an initial position of extending about member 14 in second rotational direction 60.

Redeployment of panel 12, in this example, is not shown in the accompanying FIGS. 1-13 but can be easily followed from the following description and following FIGS. 1-13, which show deploying panel 12 positioned wrapped and extending about member 14 in the second rotational direction 60, while redeployment of panel 12 is with panel 12 positioned wrapped and extending about member 14 in an opposing first rotational direction 31.

Figure 3:
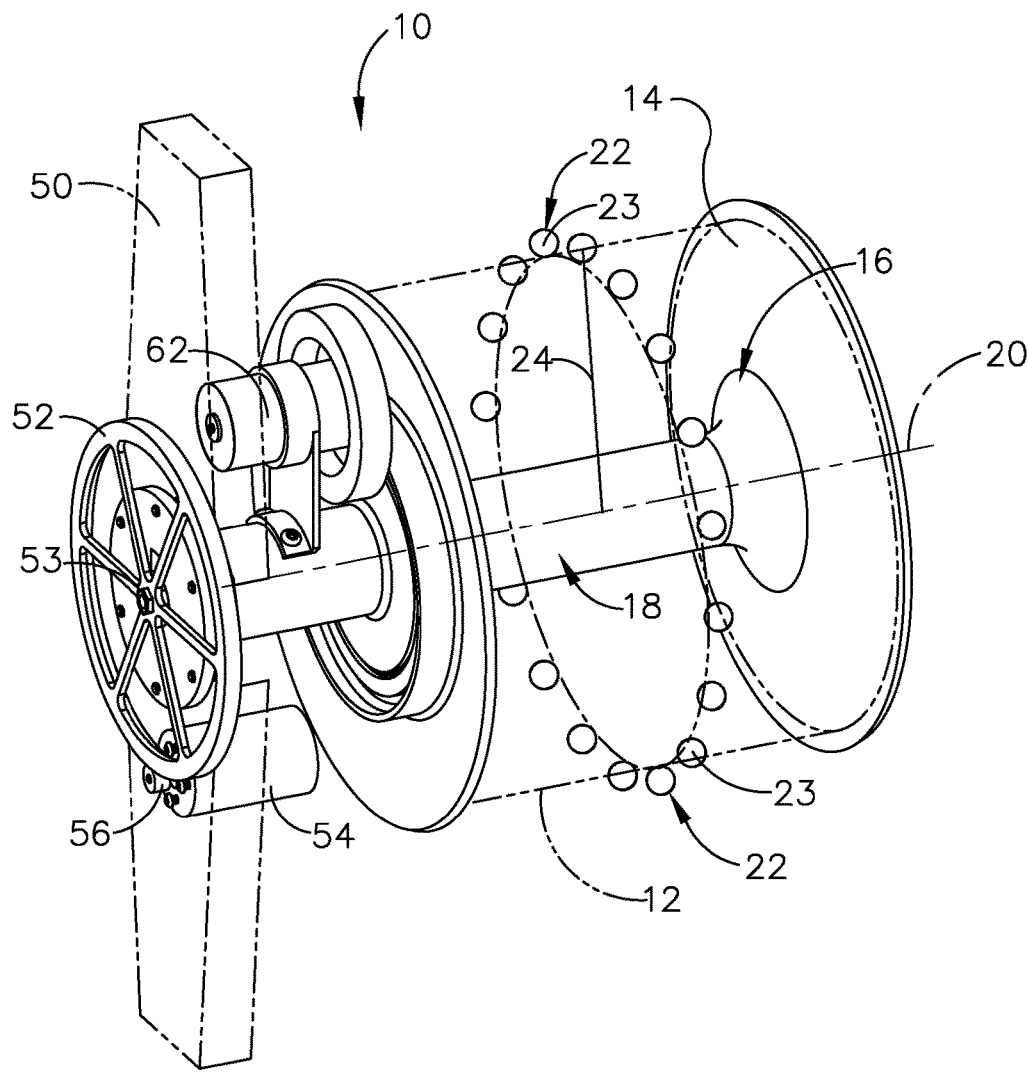
FIG. 3 is an isolated perspective view of the assembly of FIG. 1 with the spacecraft and the panel in phantom and mass components secured to the panel.

For redeployment of panel 12 from the stowed position 29, as seen in FIG. 1, member 14 is moved through opening 46 of compartment 30 to outside of compartment 30 and outside of spacecraft 32. First drive motor 54 rotates deployment screw 38, as described earlier, moving drive nut 36 in direction D resulting in moving member 14 with panel 12 and mass component 22 to position 43 outside of compartment 30 and spacecraft 32, as seen in FIG. 2. With member 14, panel 12 and mass component 22 outside of compartment 30 and spacecraft 32, second drive motor 62 rotates member 14, panel 12 and mass component 22 in second rotational direction 60 at a second rate of rotation. In this example of redeployment the second rate of rotation can be the same as the first rate of rotation of the original deployment of panel 12 but now applied in the opposite direction or second rotational direction 60. For redeployment in this example, second drive motor 62 rotates the member 14 now in second rotational direction 60 in a second rate of rotation, panel 12 is positioned wrapped about the member 14, as mentioned above, extending in first rotational direction 31, which opposes second rotational direction 60. Mass component 22 being rotated at the second rate of rotation in the second rotational direction 60 will remain at first radial distance 24 as schematically shown in FIG. 3 and acquires an angular momentum.

With member 14, panel 12 and mass component 22 at position 43 outside of compartment 30 and outside spacecraft 32, as seen for example in FIG. 2 and with one of a reduction of the second rate of rotation of the member in second rotational direction 60 about axis of rotation 20 or a stop of rotation of member 14 about axis of rotation 20, mass component 22 moves about axis of rotation of member 14 in second rotational direction 60 and increases distance from axis of rotation 20 beyond first radial distance 24 and moves to second radial distance 24 as seen for example in FIG. 6. However, now mass component 22 is moving in second rotational direction 60 which opposes first rotational direction 31 shown in FIG. 6. Mass component 22 has a tangential momentum which now is in the opposite direction of arrow 33 in FIG. 6 and has a radial momentum which is in the same radial direction of arrow 35. With mass component 22 attaining second radial distance 26 from axis of rotation 20 of the member 14 and panel 12 is in fully deployed position 34, second drive motor 62 rotates member 14 in second rotational direction 60 such that a rate of rotation of member 14 is the same as rate of rotation of mass component 22 in second rotational direction 60 at second radial distance 26. With the matching of rate of rotation in second rotational direction 60 of member 14 and mass component 22, panel 12 extends in this example in a planar direction extending away from axis of rotation 20 in fully deployed position 34.

Second drive motor 62 changes rotation of member 14 to one of stopping member 14, decreasing the rate of rotation of member 14 in second rotational direction 60 or rotating member 14 in first rotational direction 31 about axis of rotation 20 and wraps panel 12 about member 14 extending panel 12 in second rotational direction 60 about member 14. With panel 12 in a compact wrapped position about member 14, member 14 along with panel 12 and mass component 22 can be retracted from position 43 into compartment 30 to stowed position 29 until panel 12 is needed at a later time.

Figure 13:
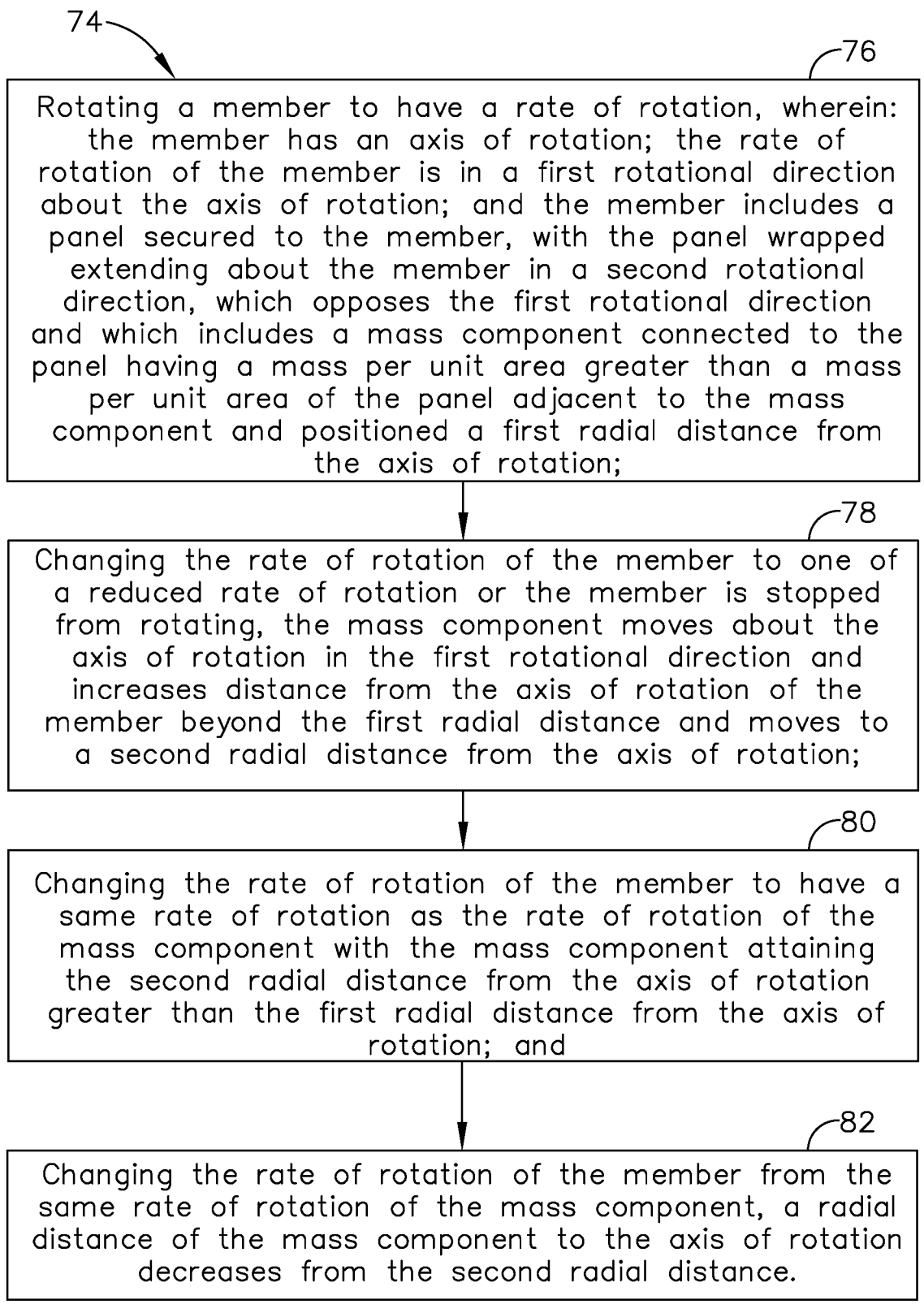
FIG. 13 is a flow chart of a method for deploying and retracting a panel for use in an outer space environment.

In referring to FIG. 13, method 74 for deploying and retracting panel 12 for use in an outer space environment, includes step 76 of rotating member 14 to have a rate of rotation, wherein member 14 has axis of rotation 20 with the rate of rotation of member 14, in this example, in first rotational direction 31 about axis of rotation 20. In addition, member 14 includes panel 12 secured to member 14, with panel 12 wrapped extending about member 14 in second rotational direction 60, which opposes first rotational direction 31. Further included is mass component 22 connected to panel 12 having a mass per unit area greater than a mass per unit area of panel 12 adjacent to mass component 22 and positioned first radial distance 24 from axis of rotation 20. Method 74 further includes step 78 of changing the rate of rotation of member 14 to one of a reduced rate of rotation or member 14 is stopped from rotating, mass component 22 moves about axis of rotation 20 in first rotational direction 31 and increases distance from axis of rotation 20 of member 14 beyond first radial distance 24 and moves to second radial distance 26 from axis of rotation 20.

Method 74 further includes step 80 of changing the rate of rotation of member 14 to have a same rate of rotation as the rate of rotation of mass component 22, with mass component 22 attaining second radial distance 26 from axis of rotation 20 greater than first radial distance 24 from axis of rotation 20. Furthermore, method 74 includes step 82 of changing the rate of rotation of member 14 from the same rate of rotation of mass component 22, a radial distance 70 of the mass component 22 to axis of rotation 20 decreases from second radial distance 26.

Step 80 further includes maintaining panel 12, in this example, in a planar configuration between mass component 22 and member 14 as earlier discussed. Step 82 of changing the rate of rotation of member 14 includes one of stopping member 14, decreasing the rate of rotation of member 14 in first rotational direction 31 or rotating member 14 in second rotational direction 60 about axis of rotation 20 and wrapping panel 12 about member 14 extending panel 12 in first rotational direction 31 about member 14. With panel 12 wrapped about member 14, member 14 along with panel 12 and mass component 22 can be placed in stowed position 29, as seen in FIG. 1 for redeployment and use at a later time.

While various embodiments have been described above, this disclosure is not intended to be limited thereto. Variations can be made to the disclosed embodiments that are still within the scope of the appended claims.

What is claimed:
1. An assembly for deployment and retraction of a panel for use in an outer space environment, comprising:
   a member secured to the panel with the member having an axis of rotation; and a mass component connected to the panel, with the panel wrapped about the member with the mass component positioned at a first radial distance from the axis of rotation, wherein the mass component has a mass per unit area greater than a mass per unit area of the panel adjacent to the mass component, such that:
with a rate of rotation of the mass component and a rate of rotation of the member having a same rate of rotation, the mass component rotates about the axis of rotation at a second radial distance from the axis of rotation, wherein the second radial distance is greater in dimension than the first radial distance; and
with the rate of rotation of the mass component and the rate of rotation of the member being changed from the same rate of rotation to having different rates of rotation, a radial distance of the mass component to the axis of rotation decreases from the second radial distance.

2. The assembly of claim 1, wherein the member includes a reel.

3. The assembly of claim 1, wherein the member is connected to a spacecraft.

4. The assembly of claim 3, further includes a compartment defined by the spacecraft for stowing the member, the panel and the mass component connected to the panel.

5. The assembly of claim 4, wherein the member is secured to a drive nut which define threads.

6. The assembly of claim 5, wherein the threads of the drive nut are compatible with and engage the threads of a deployment screw, which is positioned within the compartment and extends in a direction toward an opening defined by the compartment in the spacecraft.

7. The assembly of claim 6, wherein the deployment screw is associated with a first drive motor secured to the spacecraft, such that the first drive motor rotates the deployment screw.

8. The assembly of claim 7, wherein:
with the first drive motor rotating the deployment screw in a first rotational direction, the drive nut moves the member, the panel and the mass component through the opening defined by the compartment to a position outside of the compartment; and
with the first drive motor rotating the deployment screw in a second rotational direction, the drive nut moves the member, the panel and the mass component from the position outside of the compartment into the compartment.

9. The assembly of claim 8, wherein a second drive motor is connected to the drive nut, such that the second drive motor rotates the member.

10. The assembly of claim 9, wherein the second drive motor is associated with the member and rotates the member in one of the first rotational direction or the second rotational direction.

11. The assembly of claim 10, wherein with the second drive motor rotating the member in the first rotational direction at a first rate of rotation, the panel is positioned wrapped about the member extending in the second rotational direction about the member, which opposes the first rotational direction.

12. The assembly of claim 11, wherein:
with the member, the panel and the mass component in the position outside of the compartment and with one of a reduction of the first rate of rotation of the member in the first rotational direction about the axis of rotation or a stop of rotation of the member about the axis of rotation, the mass component moves about the axis of rotation of the member in the first rotational direction and increases distance from the axis of rotation beyond the first radial distance and moves to the second radial distance; and
with the mass component attaining the second radial distance from the axis of rotation of the member, the second drive motor rotates member in the first rotational direction such that the rate of rotation of the member and the rate of rotation of the mass component in the first rotational direction at the second radial distance have the same rate of rotation.

13. The assembly of claim 12, wherein the second drive motor changes rotation of the member to one of stopping the member, decreasing the rate of rotation of the member in the first rotational direction or rotating the member in the second rotational direction about the axis of rotation and wraps the panel about the member extending the panel in the first rotational direction about the member.

14. The assembly of claim 10, wherein with the second drive motor rotating the member in a second rotational direction in a second rate of rotation, the panel is positioned wrapped about the member extending in the first rotational direction about the member, which opposes the second rotational direction.

15. The assembly of claim 14, wherein:
with the member, the panel and the mass component in the position outside of the compartment and with one of a reduction of the second rate of rotation of the member in the second rotational direction about the axis of rotation or a stop of rotation of the member about the axis of rotation, the mass component moves about the axis of rotation of the member in the second rotational direction and increases distance from the axis of rotation beyond the first radial distance and moves to the second radial distance; and
with the mass component attaining the second radial distance from the axis of rotation of the member, second drive motor rotates member in the second rotational direction such that the rate of rotation of the member and the rate of rotation of the mass component in the second rotational direction at the second radial distance have the same rate of rotation.

16. The assembly of claim 15, wherein the second drive motor changes rotation of the member to one of stopping the member, decreasing the rate of rotation of the member in the second rotational direction or rotating the member in the first rotational direction about the axis of rotation and wraps the panel about the member extending the panel in the second rotational direction about the member.

17. The assembly of claim 1, with the mass component at the second radial distance from the axis of rotation, the panel extends between the mass component connected to the panel and the member secured to the panel.

18. A method for deploying and retracting a panel for use in an outer space environment, comprising the steps of:
rotating a member to have a rate of rotation, wherein:
the member has an axis of rotation;
the rate of rotation of the member is in a first rotational direction about the axis of rotation; and
the member includes a panel secured to the member, with the panel wrapped extending about the member in a second rotational direction, which opposes the first rotational direction and which includes a mass component connected to the panel having a mass per unit area greater than a mass per unit area of the panel adjacent to the mass component and positioned a first radial distance from the axis of rotation;

changing the rate of rotation of the member to one of a reduced rate of rotation or the member is stopped from rotating, the mass component moves about the axis of rotation in the first rotational direction and increases distance from the axis of rotation of the member beyond the first radial distance and moves to a second radial distance from the axis of rotation;

changing the rate of rotation of the member to have a same rate of rotation as the rate of rotation of the mass component with the mass component attaining the second radial distance from the axis of rotation greater than the first radial distance from the axis of rotation; and changing the rate of rotation of the member from the same rate of rotation of the mass component, a radial distance of the mass component to the axis of rotation decreases from the second radial distance.

19. The method of claim 18, changing the rate of rotation of the member to having the same rate of rotation of the mass component includes maintaining the panel in a planar configuration between the mass component and the member.

20. The method of claim 19, changing the rate of rotation of the member from the same rate of rotation of the mass component includes one of stopping the member, decreasing the rate of rotation of the member in the first rotational direction or rotating the member in the second rotational direction about the axis of rotation and wrapping the panel about the member extending the panel in the first rotational direction about the member.

* * * * *